United States Patent [19]
Starsja

[11] Patent Number: 5,302,139
[45] Date of Patent: Apr. 12, 1994

[54] MODULAR FURNITURE OUTLET

[75] Inventor: Steven J. Starsja, Princeton, Mass.

[73] Assignee: MOD-TAP W Corp., Harvard, Mass.

[21] Appl. No.: 81,521

[22] Filed: Jun. 29, 1993

[51] Int. Cl.⁵ .............................................. H01R 13/74
[52] U.S. Cl. .................................... 439/544; 439/538;
248/27.1; 248/222.1
[58] Field of Search ............... 439/538, 544, 552, 563,
439/554, 555; 248/27.1, 27.3, 222.1, 225.1,
225.2

[56] References Cited

U.S. PATENT DOCUMENTS

| 2,703,662 | 3/1955 | Meyer | 248/27.3 |
| 3,803,535 | 4/1974 | Wilson | 439/563 |
| 5,131,866 | 7/1992 | Bodenweiser et al. | 439/532 |

Primary Examiner—Gary F. Paumen
Attorney, Agent, or Firm—Hamilton, Brook, Smith & Reynolds

[57] ABSTRACT

An adaptor for securing a data communication port to a panel having a base plate with a fixed latching member and a pair of movable latching members, each engagable with an unexposed surface of a panel having a cutout when the base plate is in engagement with the exposed surface.

12 Claims, 6 Drawing Sheets

MODULAR FURNITURE OUTLET

FIELD OF THE INVENTION

This invention relates generally to data communications ports and more particularly to adaptors for accommodating such ports in modular furniture.

BACKGROUND OF THE INVENTION

Modular furniture is frequently found in offices and comprises various movable units such as computer surfaces, desks, bookshelves, racks, etc. They are assembled into office cubicles and can be broken down and reassembled when it is desired to change the configuration of the office. More furniture can be added or taken away. Such furniture generally includes panels that are assembled with office units. At the bottom of the assemblage, as well as elsewhere, are "kick plates" which are the equivalent of old-fashioned "mopboards" and communication and power wiring runs through them.

Generally speaking, kickplates are made of sheet metal, although they can also be plastic and are usually about a sixteenth of an inch thick. In order to accommodate electrical communications ports, such as power outlets, computer outlets, telephone jacks, and the like, the kickplates have openings preformed in them, which are also called panel "cutouts" and are usually rectangular.

A problem is that there has been no standardization of the size of the panel openings or cutouts. This is unlike the standard household or office 110 volt receptacle box which is secured, as for example, against a wooden stud in a wall that is made of plasterboard and is subsequently papered or painted. These standard receptacle boxes will naturally, accept standard sized modules, such as switches, electrical outlets, telephone and/or computer jacks.

An object of this invention is to produce an adaptor or adjustable receptacle to mount modules or data communication ports in any of a range of sizes of panel openings or cutouts in modular furniture. One type of module which the present invention is intended to accommodate is disclosed in U.S. Pat. No. 5,131,866 to Bodenwiser et al. and which is assigned to the Assignee of the present invention.

SUMMARY OF THE INVENTION

The invention resides in an adaptor for securing a data communication port or ports to a panel which has a front or exposed surface. The panel also has a rear or unexposed surface and a panel cutout. The adaptor includes a base plate which has a fixed projecting latching member which extends from the back of the base plate through the cutout and engages the unexposed or rear surface of the panel at the edge of the cutout when the plate itself is in engagement with the front or exposed surface.

A pair of movable latching members project from the back of the base plate and extend through the cutout and engage the unexposed surface of the panel at the edge of the cutout while the fixed latching member engages an opposite edge of the cutout. The movable members are adjustable relative to the fixed member to accommodate cutouts of different sizes.

There are frangible fingers on the base plate which are arranged normal to the direction of the movement of the latching members. They are constructed for incremental removal, one by one, to accommodate the size of the cutout measured in the direction normal to the direction of movement of the latching members.

A bezel is removably secured to a base plate and has an opening for mounting one or more communication ports. The movable latching members include teeth which mate with matching teeth on the front face of the base plate. The latching members are movable unidirectionally to locking position to maintain the base plate fixed to the panel cutout. The movable latching members also include mechanism for manually releasing them from the locking position to disassemble the adaptor.

The above and other features of the invention including various and novel details of construction and combinations of parts will now be more particularly described with reference to the accompanying drawings and pointed out in the claims. It will be understood that the particular modular furniture outlet embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
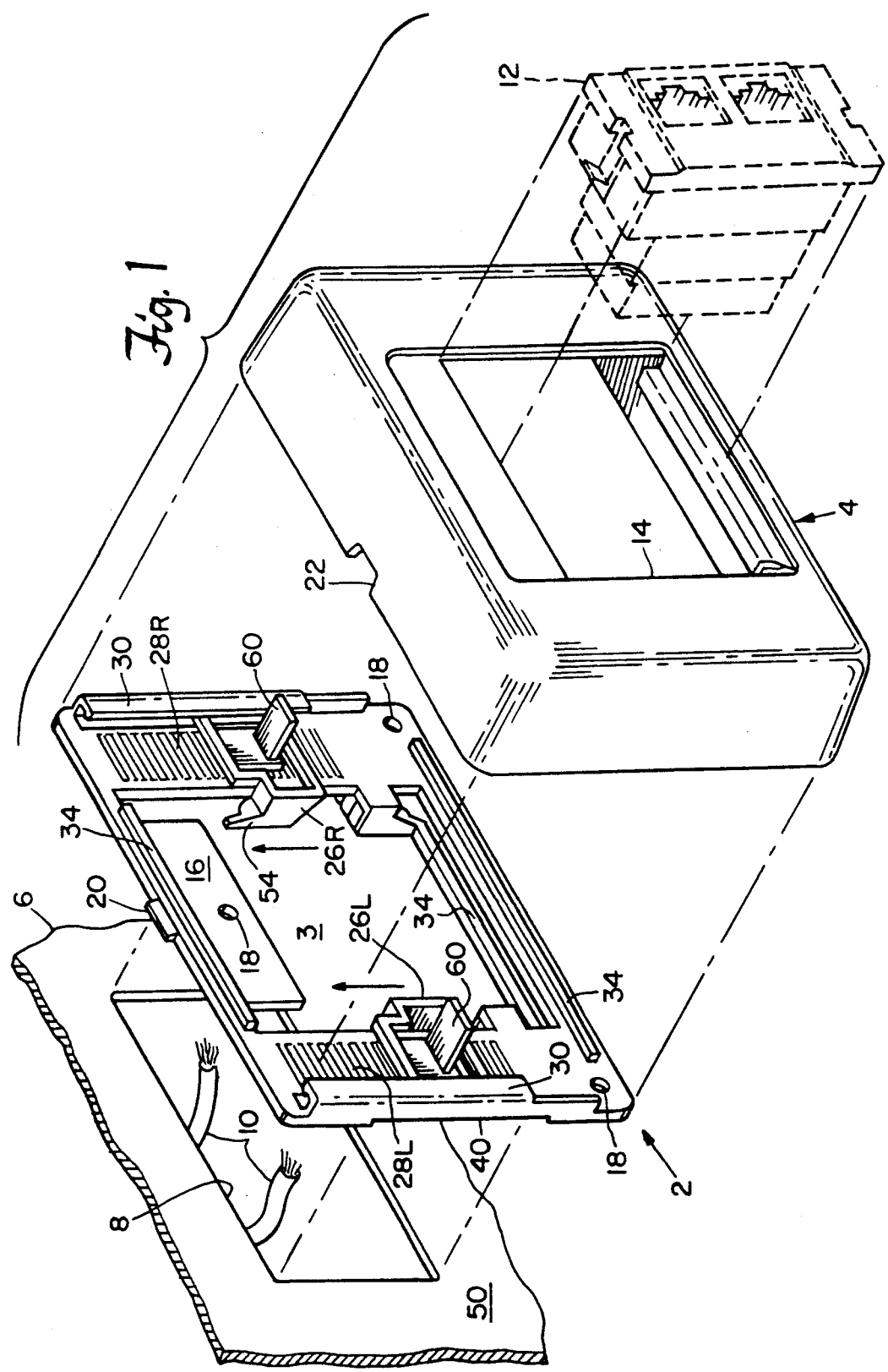
FIG. 1 is an exploded perspective view of an adaptor for securing a data communication port to an exposed surface of a panel having a rectangular cutout.

Referring initially to FIG. 1, there will be seen an adaptor for securing a data communication port to a panel having a rectangular cutout. The adaptor has a base plate 2 and a bezel 4. The base plate 2 attaches to a panel 6 which may be a kick plate or other portion of modular furniture. The panel or kick plate has a rectangular cutout 8 communication wiring 10 and is located within the panel.

A module 12 of the type disclosed in U.S. Pat. No. 5,131,866 is one of a pair which may be received in a cutout portion 14 of the bezel 4 as well as numerous other modules.

Figure 2:
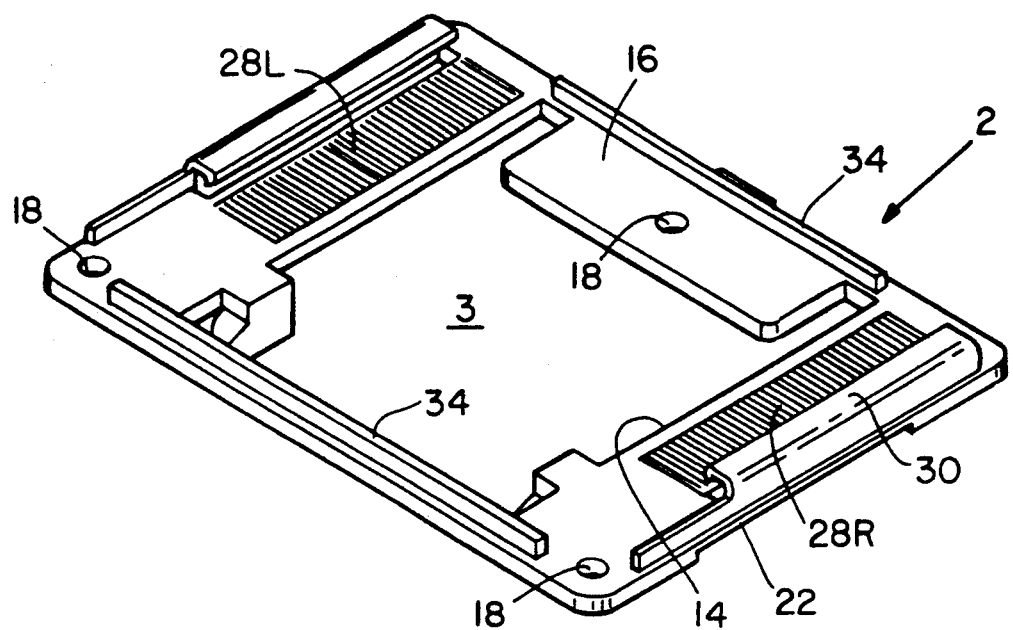
FIG. 2 is a perspective view of an outwardly or front facing surface of a base plate of the adaptor.

The outwardly or front facing surface of the base plate is seen in FIG. 1 as well as in FIG. 2. A rectangular portion extends from the top of the plate into an opening 3. One of three holes 18 which would permit the plate to be permanently secured to the panel 6 by screws if so desired is located in the portion 16. The base plate includes a tab 20 which fits within a slot 22 in the bezel 4 so that when it is desired to remove the bezel from the base plate 2, a screwdriver or light tool can be inserted into the slot 22 and pressed against the tab 20. The base plate 2 also includes a projecting fixed latching member 24. A pair of movable latching members 26R and 26L are located on the right and left hand sides of the base plate respectively as viewed in FIG. 1.

Figure 7:
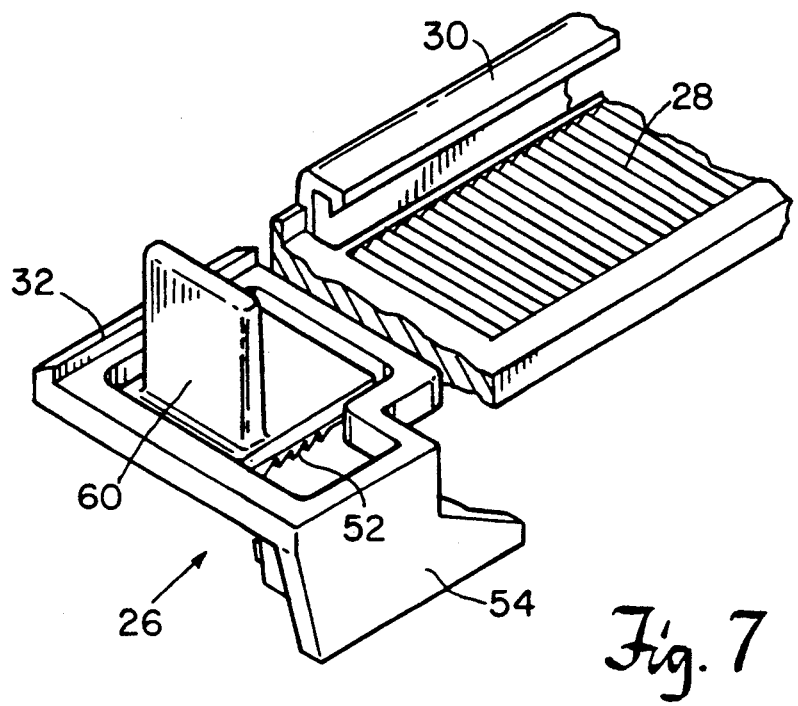
FIG. 7 is an upper perspective view of the movable latching member shown in FIGS. 4 to 6, and a portion of the mating toothed track on the base plate.
Figure 8:
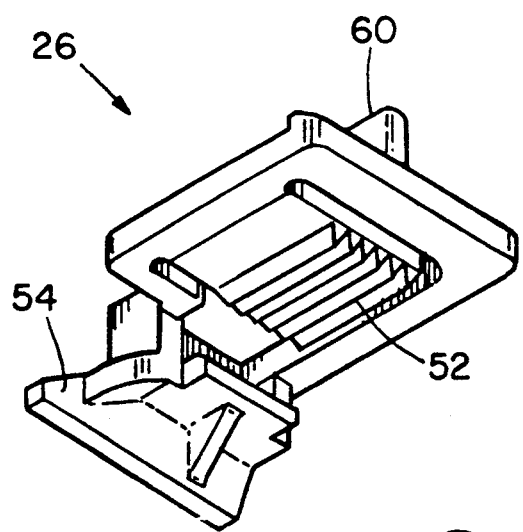
FIG. 8 is a lower perspective view of the latching member shown in FIGS. 4 to 6.

Each of movable latching members is secured for vertical movement in the direction of the arrows in FIG. 1 on toothed tracks 28R and 28L. Channels 30 are located on the edges of the base plate 2 to receive L-shaped edges 32 (FIG. 7) of the movable latching members 26. Reinforcing ribs 34 are found on the base plate and extend in the horizontal direction as viewed in FIG. 1.

Figure 12:
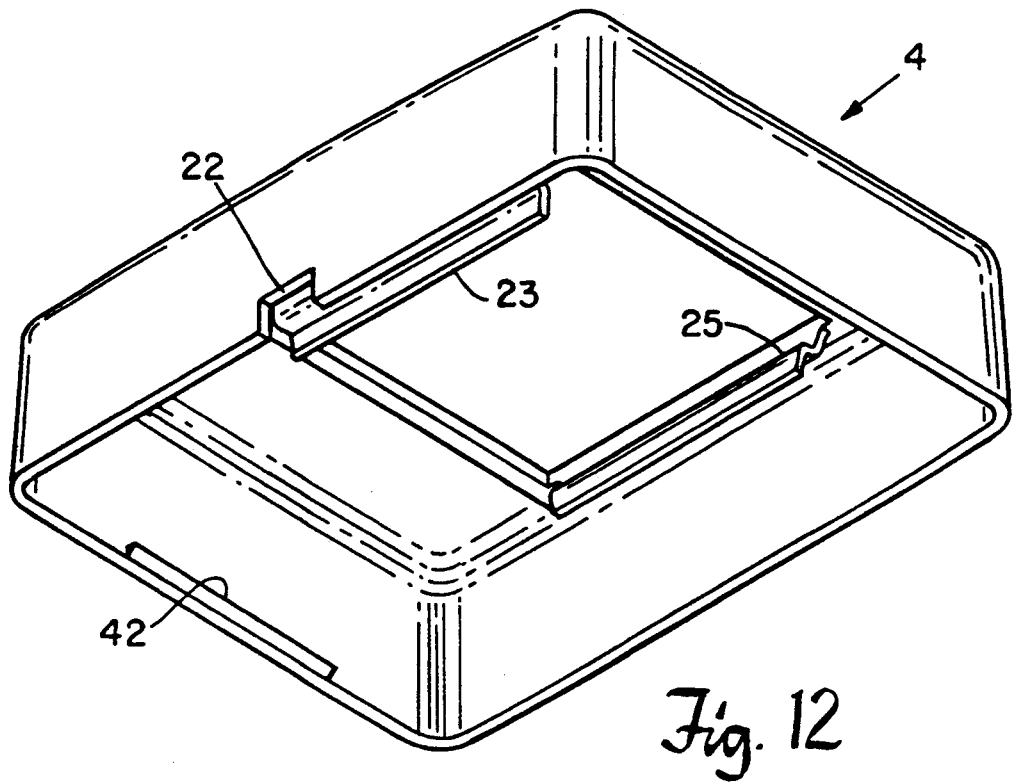
FIG. 12 is a perspective view of the inside of the bezel viewed upwardly.

There are a pair of vertically extending cutouts 40 on the base plate which accept projecting tabs 42 (FIG. 12) on the bezel when the bezel is snapped onto the base plate. The bezel also includes "S" shaped rails 23 and 25 for attaching the module 12.

Figure 3:
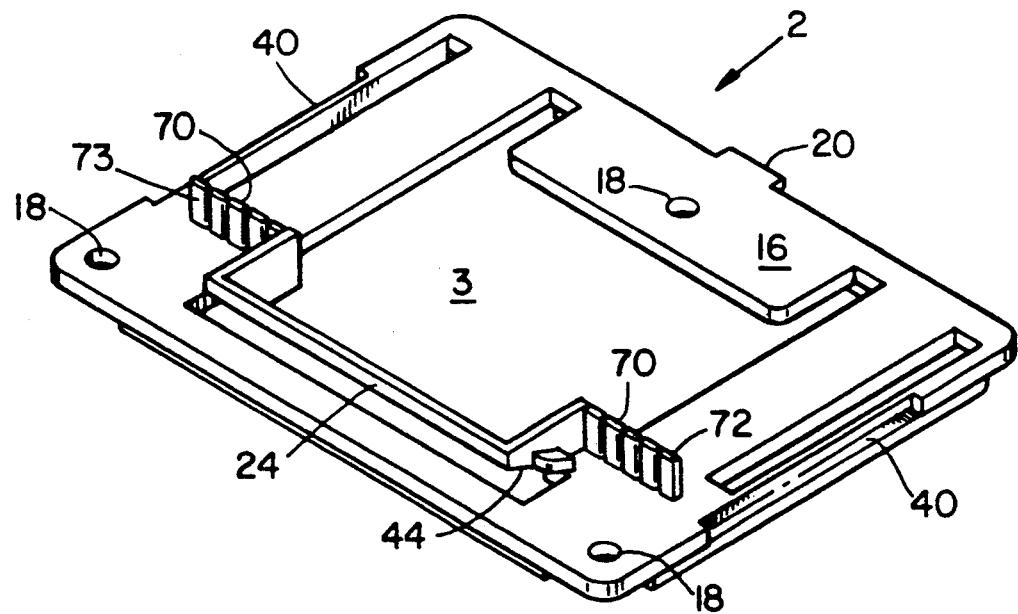
FIG. 3 is a perspective view of the rearwardly or back facing surface of the base plate.
Figure 9:
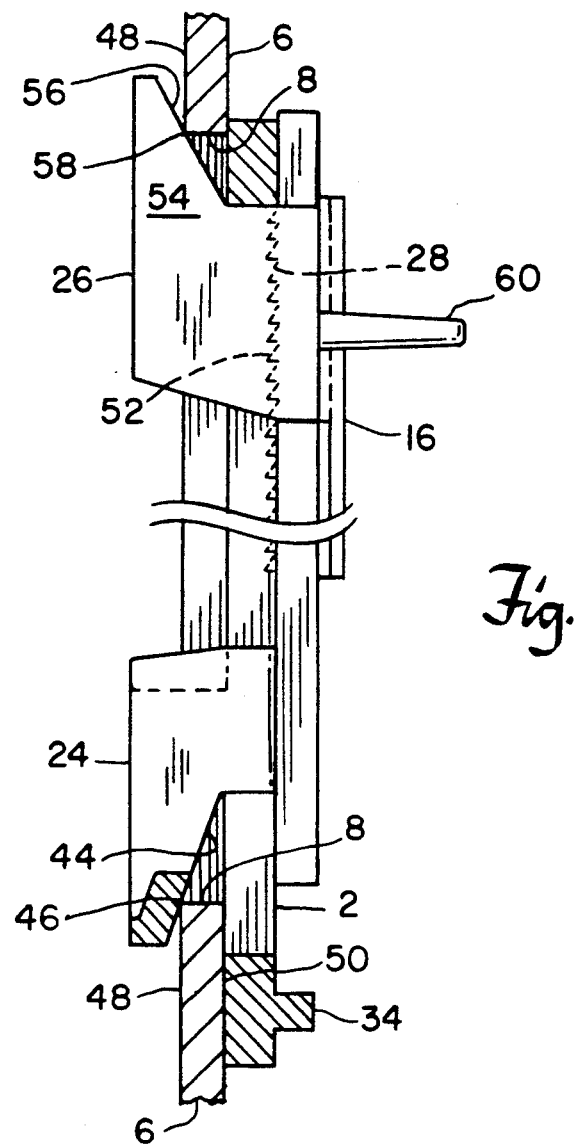
FIG. 9 is a side view of the base plate in enlarged scale showing the relative positions of the fixed latching member and a movable latching member when the base plate is secured in the cutout of the panel member.

The fixed, projecting latching member 24 will best be seen in FIGS. 3 and 9. Latching member 24 projects rearwardly from the base plate and runs across the back of the plate near the bottom of the opening 3. The fixed latching member 24 has a beveled surface 44 as seen in FIG. 9 which engages a corner 46 of the cutout 8 at its intersection with the unexposed or rear surface 48 of the panel 6, when the base plate 2 is in engagement with the front or exposed surface 50 of the panel.

The movable latching members 26R and 26L will now be described. They are mirror images of each other and are moved upwardly on the toothed tracks 28R and 28L, respectively. Each of the movable latching members includes teeth 52 which mate with the toothed track 28. The latching members 26 include a nose 54 having a beveled portion 56 (FIG. 9) which is engagable with the intersection 58 of the rear or unexposed surface 48 of the plate 6 and the upper edge of the cutout 8 when the plate 2 is engaged with the exposed or front surface 50 of the panel 6. The movable latching members also include a finger tab 60 which is formed at right angles to the plane of the teeth 52.

Figure 5:
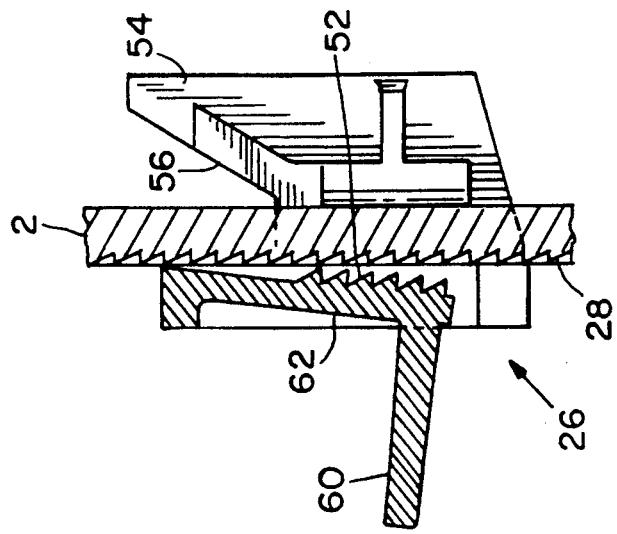
FIG. 5 is a sectional view taken on the line V—V on FIG. 4 with the latching member out of engagement with the toothed portion of the base plate.
Figure 6:
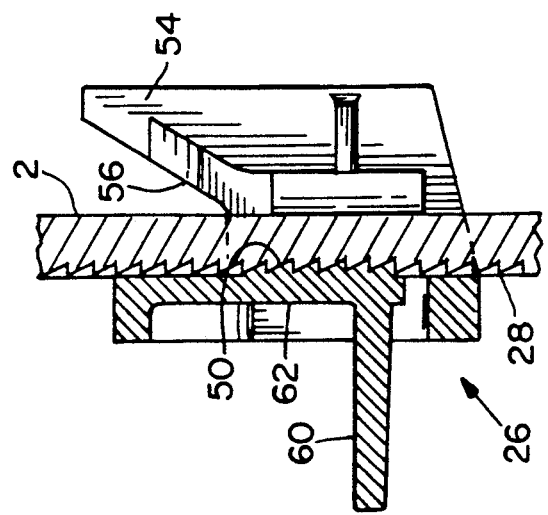
FIG. 6 is a view also taken on the line V—V on FIG. 4 but with the movable latching member in engagement with the toothed portion of the base plate.
Figure 4:
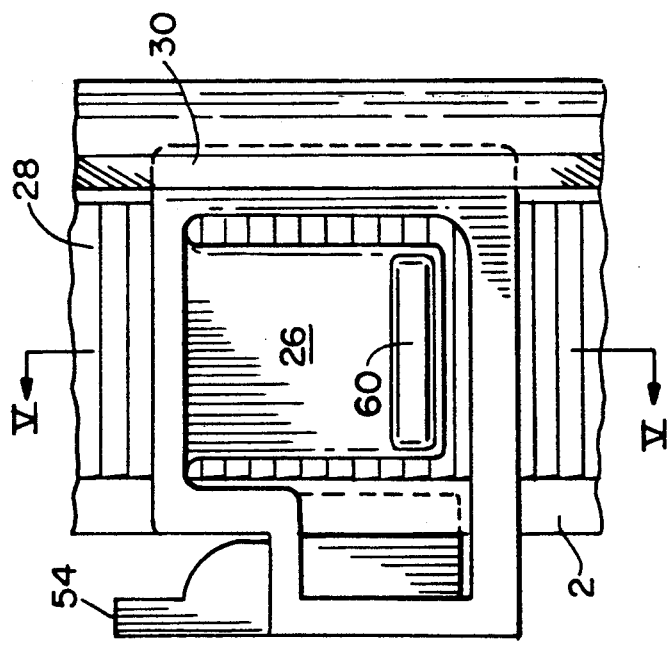
FIG. 4 is a view of a toothed track portion of the base plate mounting a movable latching member shown on enlarged scale.

Again referring to FIG. 9, when the fixed latching member 24 is engaged behind the panel, each of the movable latching members 26R, 26L may be pushed upwardly on the toothed tracks 28 until the beveled portion 56 of the nose 54 engages behind the panel 6 as seen in FIG. 9. Because of their shape, when the teeth 52 of the latching members are in engagement with the teeth 28 of the rack, movement can only be in an upward direction as viewed in FIGS. 5 and 6. When it is desired to remove the base plate 2 from the panel 6, fingers 60 are urged in a clockwise direction as viewed in FIGS. 5 and 6 causing the living hinge portion 62 of the movable latching members to flex from the FIG. 6 to the FIG. 5 position permitting the latching members to be moved downwardly. After the bezel has been removed and the latching members 26 have been moved downwardly, the base plate can be tilted outwardly from the cutout 8.

Figure 10:
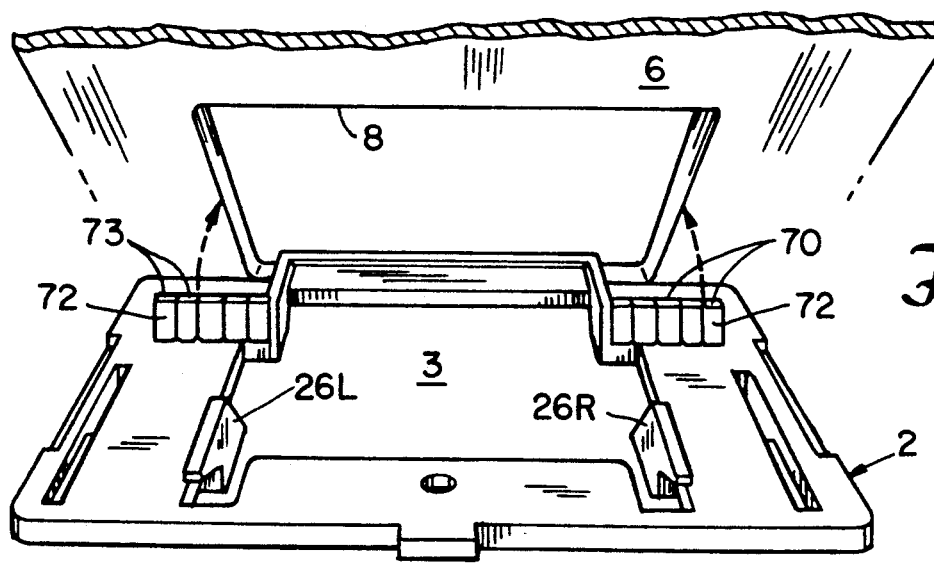
FIG. 10 is a perspective view of the base plate and panel cutout showing the frangible fingers.
Figure 11:
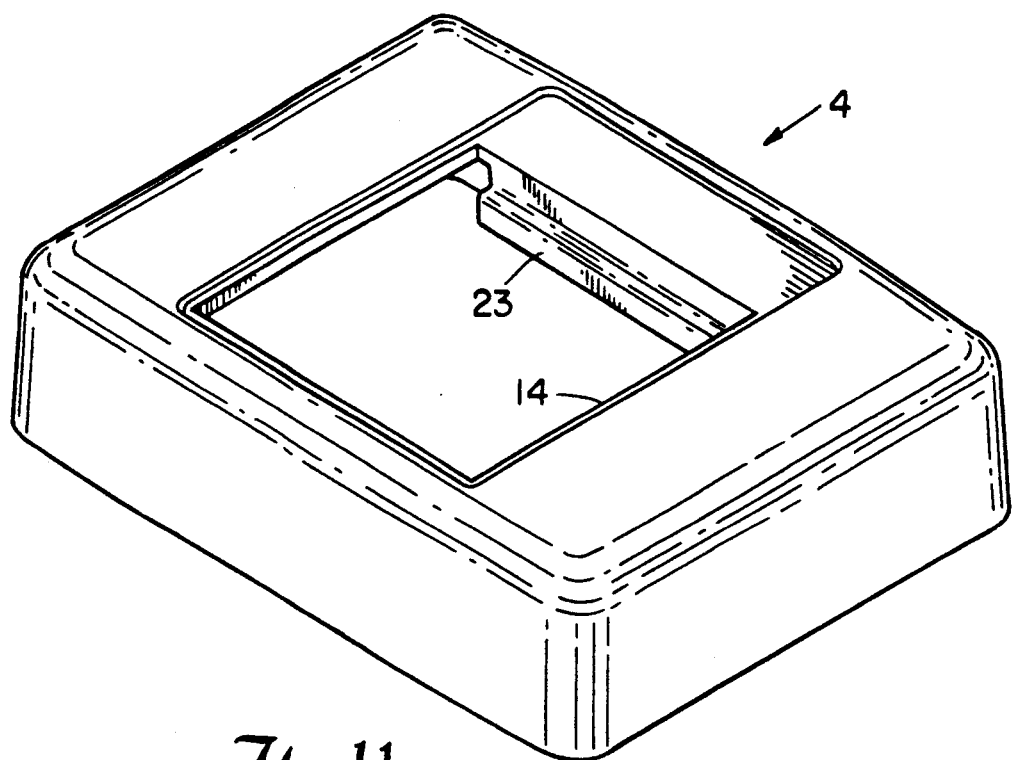
FIG. 11 is a perspective view of the bezel.

As will be seen in FIGS. 3 and 10, the base plate is provided with a plurality of frangible fingers 70 which are arranged normal to the direction of movement of the latching members, i.e. horizontally as viewed in FIG. 10. Their purpose is to accommodate the size of the cutout 8 and to anchor the plate in the cutout against movement in the lateral direction. As will be seen in FIG. 10, there are five fingers 70 on each side of the opening 3. In accordance with the lateral dimension of the cutout 8 in the panel 6, any number of frangible fingers 70 may be broken off beginning with the outside tab 72 of each set. This prevents lateral movement of the base plate with regard to panel 6.

I claim:

1. An adaptor for securing a data communication port to a panel having an exposed surface, an unexposed surface and a panel cutout comprising:
   a base plate having a projecting latching member immovable relative thereto for extending through the cutout and engaging the unexposed surface of the panel when the plate is in engagement with the exposed surface, and
   movable latching members separate from and projecting from the plate for extending through the cutout and engaging the unexposed surface of the panel;
   the movable members being adjustable toward and away from the fixed member to accommodate cutouts of different sizes.

2. Adaptor according to claim 1, wherein mating teeth join the movable latching members to the base plate.

3. Adaptor according to claim 1, wherein the movable locking members are movable unidirectionally to maintain the base plate fixed to the panel cutout.

4. Adaptor according to claim 1, wherein the movable locking members are movable unidirectionally into locking position and have a mechanism for releasing them from the locking member.

5. An adaptor for securing a data communication port to a panel having an exposed surface, an unexposed surface and a panel cutout comprising:
   a base plate having a projecting latching member immovable relative thereto for extending through the cutout and engaging the unexposed surface of the panel when the plate is in engagement with the exposed surface,
   movable latching members separate from and projecting from the plate for extending through the cutout and engaging the unexposed surface of the panel;
   the movable members being adjustable toward and away from the fixed member to accommodate cutouts of different sizes, and
   frangible fingers on the base plate arranged normal to the direction of movement of the latching members for incremental removal to accommodate the size of the cutout measured normal to the direction of movement.

6. Adaptor according to claim 5, wherein mating teeth join the movable latching members to the base plate.

7. Adaptor according to claim 5, wherein the movable locking members are movable unidirectionally to maintain the base plate fixed to the panel cutout.

8. Adaptor according to claim 5, wherein the movable locking members are movable unidirectionally into locking position and have a mechanism for releasing them from the locking member.

9. An adaptor for securing a data communication port to a panel having an exposed surface, an unexposed surface and a panel cutout comprising:
- a base plate having a projecting latching member immovable relative thereto for extending through the cutout and engaging the unexposed surface of the panel when the plate is in engagement with the exposed surface,
- movable latching members separate from and projecting from the plate for extending through the cutout and engaging the unexposed surface of the panel;
- the movable members being adjustable toward and away from the fixed member to accommodate cutouts of different sizes, and
- a bezel removably secured to the base plate and having an opening for removably securing a data communication port.

10. Adaptor according to claim 9, wherein mating teeth join the movable latching members to the base plate.

11. Adaptor according to claim 9, wherein the movable locking members are movable unidirectionally to maintain the base plate fixed to the panel cutout.

12. Adaptor according to claim 9, wherein the movable locking members are movable unidirectionally into locking position and have a mechanism for releasing them from the locking member.

* * * * *